United States Patent
Iida et al.

(10) Patent No.: US 10,596,831 B2
(45) Date of Patent: Mar. 24, 2020

(54) INKJET PRINTING METHOD AND INKJET PRINTING APPARATUS

(71) Applicant: CANON KABUSHIKI KAISHA, Tokyo (JP)

(72) Inventors: Kenichi Iida, Kawasaki (JP); Kazuhiko Araki, Kawasaki (JP); Tetsufumi Shiba, Kawasaki (JP); Takatoshi Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/977,555

(22) Filed: May 11, 2018

(65) Prior Publication Data
US 2018/0333970 A1    Nov. 22, 2018

(30) Foreign Application Priority Data

May 17, 2017  (JP) .................................. 2017-098240
Apr. 13, 2018  (JP) .................................. 2018-077806

(51) Int. Cl.
*B41J 11/00* (2006.01)
*B41J 2/21* (2006.01)
(Continued)

(52) U.S. Cl.
CPC .......... *B41J 11/0015* (2013.01); *B41J 2/2114* (2013.01); *B41M 3/008* (2013.01);
(Continued)

(58) Field of Classification Search
CPC ........ B41J 2/1433; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593;
(Continued)

(56) References Cited

U.S. PATENT DOCUMENTS 6,412,940 B1    7/2002  Inoue
2006/0210732 A1*  9/2006  Hiyama ............... B41M 5/5227
                                                    428/32.24
(Continued)

FOREIGN PATENT DOCUMENTS

EP      2574475 A2    4/2013
JP      2004-285106 A  10/2004
(Continued)

*Primary Examiner* — Manish S Shah
(74) *Attorney, Agent, or Firm* — Canon USA, Inc., IP Division

(57) ABSTRACT

An inkjet printing method including the steps of applying a first ink to a printing medium and applying a second ink to the printing medium so as to at least overlap a region provided with the first ink, wherein the first ink is an aqueous ink containing silver particles, the second ink is an aqueous ink containing an anionic dye, the printing medium includes an ink-receiving layer containing at least one cationic compound selected from a group consisting of a polyvalent metal salt and a salt of a cationic resin, and the content (g/m$^2$) of the cationic compound per unit area of the ink-receiving layer is 0.20 g/m$^2$ or more.

17 Claims, 1 Drawing Sheet

(51) Int. Cl.
*B41M 5/52* (2006.01)
*B41M 3/00* (2006.01)
*B41M 5/00* (2006.01)

(52) U.S. Cl.
CPC ........ *B41M 5/0017* (2013.01); *B41M 5/0023* (2013.01); *B41M 5/5218* (2013.01); *B41M 5/5245* (2013.01)

(58) Field of Classification Search
CPC ...... B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| 2013/0057616 | A1* | 3/2013 | Hirata | B41J 2/2107 |
| | | | | 347/100 |
| 2013/0257988 | A1 | 10/2013 | Xiang | |
| 2014/0370250 | A1* | 12/2014 | Fujii | C08F 283/12 |
| | | | | 428/195.1 |

FOREIGN PATENT DOCUMENTS

| JP | 2015-193126 A | 11/2015 |
| JP | 2015-193127 A | 11/2015 |
| JP | 2016-14141 A | 1/2016 |
| JP | 2016-108545 A | 6/2016 |
| WO | 2008/049519 A1 | 5/2008 |

* cited by examiner

INKJET PRINTING METHOD AND INKJET PRINTING APPARATUS

BACKGROUND OF THE INVENTION

Field of the Invention

The present disclosure relates to an inkjet printing method and an inkjet printing apparatus.

Description of the Related Art

An ink containing metal particles has been used to form an electric circuit by utilizing the feature of the metal particles used and, in recent years, has also been applied to use, e.g., a Christmas card, that has expressed a metallic feeling. In particular, in order to enhance decorativeness of a color image, it is desired to print a color image having a metallic feeling (hereafter referred to as a "color metallic image"). For the purpose of printing a color metallic image, an ink set of an oil-based ink containing an aluminum pigment and an oil-based ink containing a dye has been proposed (refer to Japanese Patent Laid-Open No. 2016-14141). Also, an inkjet printing method has been proposed, in which a processing agent containing inorganic particles has applied to a printing medium, and an aqueous ink containing silver particles and an aqueous ink containing a pigment have been applied sequentially to a region provided with the processing agent so as to overlay one ink on another (refer to Japanese Patent Laid-Open No. 2015-193126). In addition, an inkjet printing method has been proposed, in which an ink containing silver particles and an ink containing a dye have been applied in this order so as to overlay one ink on another (refer to Japanese Patent Laid-Open No. 2015-193127).

The oil-based ink described in Japanese Patent Laid-Open No. 2016-14141 requires odor treatment of an organic solvent evaporated. Therefore, the present inventors were predicated on use of an aqueous ink rather than an oil-based ink. In addition, an image was printed in the same method as the inkjet printing method described in Japanese Patent Laid-Open No. 2015-193126 except that the aqueous ink containing a pigment was changed to an aqueous ink containing a dye in order to obtain an image having excellent transparency. As a result, it was found that color developability of the image was not obtained. Further, when an image was printed in the same method as the inkjet printing method described in Japanese Patent Laid-Open No. 2015-193127, it was found that the color developability of the image was not obtained.

SUMMARY OF THE INVENTION

Accordingly, the present disclosure provides an inkjet printing method in which an image has excellent color developability. In addition, the present disclosure provides an inkjet printing apparatus in which the inkjet printing method is adopted.

The present disclosure provides an inkjet printing method including the steps of applying a first ink to a printing medium and applying a second ink to the printing medium so as to at least overlap a region provided with the first ink, wherein the first ink is an aqueous ink containing silver particles, the second ink is an aqueous ink containing an anionic dye, the printing medium includes an ink-receiving layer containing at least one cationic compound selected from a group consisting of a polyvalent metal salt and a salt of a cationic resin, and the content (g/m$^2$) of the cationic compound per unit area of the ink-receiving layer is 0.20 g/m$^2$ or more.

In addition, the present disclosure provides an inkjet printing apparatus including a unit arranged to apply a second ink to a printing medium after a first ink is applied to the printing medium, wherein the first ink is an aqueous ink containing silver particles, the second ink is an aqueous ink containing an anionic dye, the printing medium includes an ink-receiving layer containing at least one cationic compound selected from a group consisting of a polyvalent metal salt and a salt of a cationic resin, and the content (g/m$^2$) of the cationic compound per unit area of the ink-receiving layer is 0.20 g/m$^2$ or more.

According to the present disclosure, an inkjet printing method in which an image has excellent color developability and an inkjet printing apparatus are provided.

Further features will become apparent from the following description of exemplary embodiments with reference to the attached drawings.

BRIEF DESCRIPTION OF THE DRAWINGS

FIG. 1A is a perspective view of a key portion of the inkjet printing apparatus, and FIG. 1B is a perspective view of a head cartridge.

DESCRIPTION OF THE EMBODIMENTS

Figure 1A:
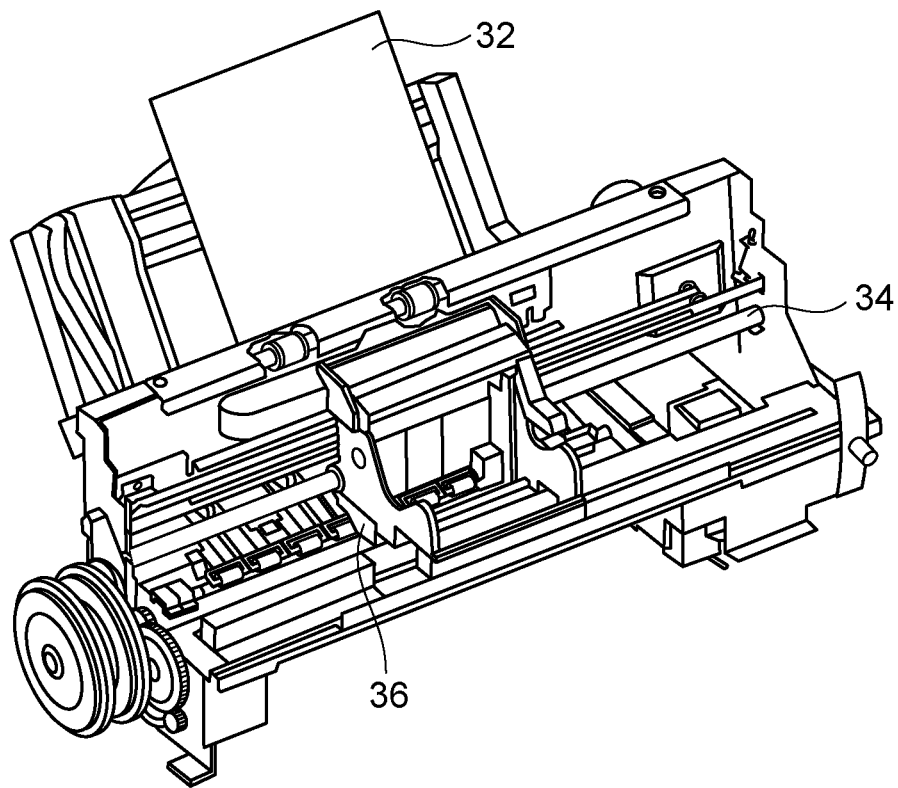
FIGS. 1A and 1B are schematic diagrams showing an example of an inkjet printing apparatus used for an inkjet printing method.

The embodiments according to the present disclosure will be described below in detail. Various physical property values are values at a temperature of 25° C. unless otherwise specified. In the present disclosure, an image having color developability refers to an image having a color tone of a dye used rather than silver.

In general, in consideration of ejection stability, particles having particle diameters of several nanometers to several hundred nanometers have to be used for an inkjet aqueous ink and, therefore, the particle diameters of silver particles serving as a coloring material have to be decreased. The silver particles are composed of silver atoms. Regarding silver particles having small particle diameters, the proportion of silver atoms present on the surfaces of silver particles in a total number of silver atoms is larger than the proportion in the case of silver particles having large particle diameters. The silver atoms present on the surfaces of silver particles readily move compared with silver atoms inside the silver particles that do not readily move due to metallic bonds with surrounding silver atoms and, as a result, form metallic bonds with silver atoms present on the surfaces of nearby silver particles so as to cause fusing. In this manner, silver particles having small particle diameters fuse with nearby silver particles so as to realize glossiness of an image.

It was found that when an aqueous ink containing silver particles was applied to a printing medium and, thereafter, an aqueous ink containing an anionic dye was applied to the printing medium so as to at least overlap a region provided with the ink containing silver particles, glossiness of an image was improved but color developability of the image was not obtained.

When the resulting image was analyzed, in a silver layer formed on the printing medium, silver particles were partly fused with each other but several nanometers of pores were present. Then, it was found that the dye in the ink passed through pores of the silver layer so as to permeate into the printing medium and, as a result, color developability of the image was not obtained.

The present inventors investigated the configuration of an inkjet printing method for the purpose of realizing the color developability of the image. The inkjet printing method includes the steps of applying a first ink to a printing medium and applying a second ink to the printing medium so as to at least overlap a region provided with the first ink. The first ink is an aqueous ink containing silver particles, and the second ink is an aqueous ink containing an anionic dye. Further, the printing medium includes an ink-receiving layer containing at least one cationic compound selected from the group consisting of a polyvalent metal salt and a salt of a cationic resin, and the content ($g/m^2$) of the cationic compound per unit area of the ink-receiving layer is 0.20 $g/m^2$ or more. The mechanism, in which color developability of the image is obtained by the inkjet printing method having the above-described configuration will be described in detail.

When the first ink is attached to the printing medium and a liquid component in the first ink is evaporated, silver particles approach and fuse with each other. Consequently, a silver layer is formed in which silver particles fuse with each other while pores are present.

In addition, when the second ink is applied, the cationic compound in the ink-receiving layer is dissolved into the liquid component in the second ink. The cationic compound bleeds to the surface through pores of the silver layer. In this process, the cationic compound captures or salts out a component, by which silver particles are dispersed, so as to agglomerate silver particles. As a result, pores in the silver layer are decreased and a dense silver layer is formed. In this case, even when a dye is not agglomerated in contrast to the description below, the dye is readily retained in the silver layer and color developability of the image is obtained.

The cationic compound that bleeds to the surface of the silver layer reacts with anionic groups included in the dye and cause precipitation due to salting-out of the dye that has been dissolved. Consequently, the dye is agglomerated and does not readily pass through the silver layer. As a result, the dye is readily retained in the silver layer, and color developability of the image is obtained.

The ink-receiving layer has only to contain a cationic compound of any one of a polyvalent metal salt and a salt of a cationic resin.

Further, the content ($g/m^2$) of the cationic compound per unit area of the ink-receiving layer is 0.20 $g/m^2$ or more. Some of common printing media including an inkjet ink-receiving layer in the related art contain a cationic substance, e.g., polydiallyldimethylammonium chloride or polyaluminum chloride. However, the content thereof is far less than the range of 0.20 $g/m^2$ or more. An important point of the inkjet printing method according to the present disclosure is that the amount of the cationic compound included in the ink-receiving layer of the printing medium is as much as 0.20 $g/m^2$ or more. If the content is less than 0.20 $g/m^2$, the content of the cationic compound per unit area of the ink-receiving layer is small and, thereby, silver particles or dye is not readily agglomerated. As a result, the dye in the second ink is not readily retained in the printing medium and, therefore, color developability of the image is not obtained.

Inkjet Printing Method

The inkjet printing method according to the present disclosure includes the steps of applying a first ink to a printing medium and applying a second ink to the printing medium so as to at least overlap a region provided with the first ink.

In the printing step, an image can be printed by ejecting an ink from an inkjet type printing head. Examples of systems to eject an ink includes a system in which mechanical energy is applied to an ink and a system in which thermal energy is applied to an ink. In the present disclosure, a system in which thermal energy is applied to an ink so as to eject the ink can be adopted. In the inkjet printing method according to the present disclosure, activation energy ray irradiation is not necessary.

Figure 1B:
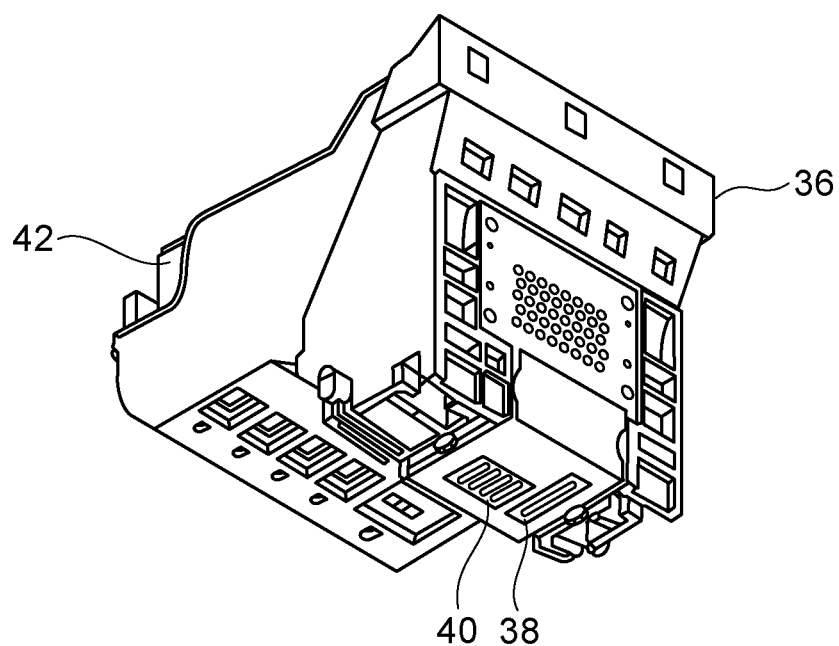

FIGS. 1A and 1B are schematic diagrams showing an example of an inkjet printing apparatus used for the inkjet printing method according to the present disclosure, FIG. 1A is a perspective view of a key portion of the inkjet printing apparatus, and FIG. 1B is a perspective view of a head cartridge. The inkjet printing apparatus includes a conveying unit (not shown in the drawing), which conveys a printing medium 32, and a carriage shaft 34. A head cartridge 36 may be mounted on the carriage shaft 34. The head cartridge 36 is provided with printing heads 38 and 40 and an ink cartridge 42 is arranged to be set. The ink (not shown in the drawing) is ejected from the printing heads 38 and 40 toward the printing medium 32 while the head cartridge 36 is conveyed along the carriage shaft 34 in the main scanning direction. Further, the printing medium 32 is conveyed in the sub-scanning direction by the conveying unit (not shown in the drawing) and, as a result, an image is printed on the printing medium 32.

First Ink

A first ink is an aqueous ink containing silver particles. Components constituting the first ink will be described below.

Silver Particles

Silver particles are composed of silver atoms. The silver particles may be configured to contain other metal atoms, oxygen atoms, sulfur atoms, carbon atoms, and the like in addition to silver atoms. The proportion (%) of silver atoms in the silver particles is preferably 50.0% by mass or more.

Examples of methods for producing the silver particles include a method in which blocks of silver are pulverized by a pulverizer, e.g., a ball mill or a jet mill (pulverization method) and a method in which silver ions or a silver complex is reduced by a reducing agent so as to be agglomerated (reducing method). Silver particles can be produced by the reducing method from the viewpoint of ease of controlling the silver particle diameter and dispersion stability of the silver particles.

Particle Diameter at Cumulative Volume of 50% ($D_{50}$) of Silver Particles

A particle diameter at a cumulative volume of 50% of silver particles refers to a diameter of a particle that corresponds to a cumulative volume, which is accumulated from a small particle diameter side, of 50% of a total volume of the silver particles measured, with respect to a particle diameter cumulative curve. The particle diameter (nm) at a cumulative volume of 50% of silver particles is preferably 200 nm or less, and more preferably 150 nm or less. The reason is as described below.

If $D_{50}$ is 150 nm or less, the particle diameters of silver particles are small and, therefore, the proportion of silver atoms present on the surfaces of the silver particles in the total number of silver atoms increases. That is, the proportion of easy-to-move silver atoms in the silver particles increases and, thereby, the easy-to-move silver atoms are readily fused with silver atoms present on the surfaces of nearby silver particles by forming metallic bonds. As a result, the glossiness of the image is further enhanced. The value of $D_{50}$ is determined by observing the cross section of the resulting image with a scanning electron microscope (SEM), a transmission electron microscope (TEM), or the like. The value of $D_{50}$ is further preferably 1 nm or more.

Method for Dispersing Silver Particles

Examples of methods for dispersing silver particles include a surfactant dispersion type in which a surfactant is used as a dispersant and a resin dispersion type in which a resin is used as a dispersant. As a matter of course, regarding the first ink, silver particles prepared by different dispersion methods may be used in combination.

Examples of surfactants used as the dispersant in the surfactant dispersion type include anionic surfactants, nonionic surfactants, cationic surfactants, and amphoteric surfactants. Examples of anionic surfactants include fatty acid salts, alkyl sulfates, alkyl aryl sulfonates, alkyl diaryl ether disulfonates, dialkyl sulfosuccinates, alkyl phosphates, naphthalenesulphonic acid formalin condensates, polyoxyethylene alkyl ether sulfates, polyoxyethylene alkyl phosphates, and glycerol borate fatty acid esters. Examples of nonionic surfactants include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-based compounds, and silicone-based compounds. Examples of cationic surfactants include alkylamine salts, quaternary ammonium salts, alkylpyridinium salts, and alkylimidazolium salts. Examples of amphoteric surfactants include alkylamine oxides and phosphadylcholine.

In particular, at least one selected from the group consisting of the anionic surfactant and the nonionic surfactant can be used as the surfactant. The anionic surfactant can be a polyoxyethylene alkyl ether sulfate, and the nonionic surfactant can be a polyoxyethylene alkyl ether.

The resin used as the dispersant in the resin dispersion type can have both a hydrophilic section and a hydrophobic section. Examples of the resin include polyvinyl resins, polyester resins, amino resins, acrylic resins, epoxy resins, polyurethane resins, polyether resins, polyamide resins, unsaturated polyester resins, phenol resins, silicone resins, and fluoropolymer compounds.

The weight average molecular weight (Mw) of the resin as polystyrene on the basis of gel permeation chromatography (GPC) is preferably 1,000 or more to 100,000 or less, and further preferably 3,000 or more to 50,000 or less.

The content (% by mass) of the dispersant in the first ink is preferably 1.0 times or less the content (% by mass) of silver particles in a mass ratio. If the mass ratio is more than 1.0 times, the amount of dispersant is excessive relative to silver particles, the silver particles do not readily approach each other, and the silver particles are not readily fused with each other. As a result, the glossiness of the image is not sufficiently obtained in some cases.

When the dispersant is the surfactant, the mass ratio is further preferably 0.02 times or more. When the dispersant is the resin, the mass ratio is further preferably 0.05 times or more. When the dispersant is the surfactant, if the mass ratio is less than 0.02 times, the amount of the dispersant is excessively small relative to silver particles in the first ink and, as a result, the silver particles are not readily and stably dispersed in the first ink. Consequently, in some cases, ejection stability of the ink is not sufficiently obtained. When the dispersant is the resin, if the mass ratio is less than 0.05 times, in some cases, ejection stability of the ink is not sufficiently obtained for the same reason as that described above.

The content (% by mass) of silver particles in the first ink is preferably 2.0% by mass or more to 15.0% by mass or less with reference to the total mass of the first ink. If the content is less than 2.0% by mass, the amount of silver particles is excessively small and, as a result, the silver particles do not readily approach each other. Consequently, the silver particles are not readily fused with each other, and the glossiness of the image is not sufficiently obtained in some cases. If the content is more than 15.0% by mass, the amount of silver particles is excessive so as to increase the viscosity of the ink and, as a result, ejection stability of the ink is not sufficiently obtained in some cases. The content (% by mass) of silver particles in the first ink is further preferably 2.0% by mass or more to 8.0% by mass or less with reference to the total mass of the first ink.

Surfactant

The first ink can contain another surfactant in addition to the surfactant usable as the dispersant of silver particles. Regarding the other surfactant, an anionic surfactant, a nonionic surfactant, a cationic surfactant, an amphoteric surfactant, and the like may be used. In particular, the surfactant can be the nonionic surfactant. Examples of the nonionic surfactant include an ethylene oxide adduct of acetylene glycol. In particular, an HLB value based on a Griffin method of the nonionic surfactant is preferably 10 or more. If the HLB value is less than 10, solubility into the first ink is reduced because of high hydrophobicity. The HLB value based on the Griffin method is calculated from the formula weight of an ethylene oxide group of the surfactant and the molecular weight of the surfactant by using a formula, HLB value=20×(formula weight of ethylene oxide group of surfactant)/(molecular weight of surfactant). The HLB value indicates the degree of hydrophilicity or lipophilicity of a surfactant (compound) in the range of 0 to 20. A lower HLB value indicates higher lipophilicity (hydrophobicity) of the compound. On the other hand, a higher HLB value indicates higher hydrophilicity of the compound.

The content (% by mass) of the surfactant serving as the dispersant of silver particles in the first ink is preferably 0.1% by mass or more to 3.0% by mass or less. The content (% by mass) of the surfactant other than the surfactant serving as the dispersant of silver particles in the first ink is preferably 0.1% by mass or more to 2.0% by mass or less.

Aqueous Medium

The first ink includes an aqueous medium that is water or a mixed solvent of water and a water-soluble organic solvent. Deionized water (ion-exchanged water) can be used as the water. There is no particular limitation regarding the water-soluble organic solvent, and any one of solvents, e.g., alcohols, glycols, glycol ethers, and nitrogen-containing compounds, usable for an inkjet ink may be used. At least one of these water-soluble organic solvents may be included in the ink.

The content (% by mass) of the water in the first ink is preferably 50.0% by mass or more to 95.0% by mass or less with reference to the total mass of the ink. The content (% by mass) of water-soluble organic solvent in the first ink is preferably 3.0% by mass or more to 50.0% by mass or less with reference to the total mass of the first ink. If the content of the water-soluble organic solvent is less than 3.0% by mass, when the first ink is used for an inkjet printing apparatus, reliability, e.g., sticking resistance, is not sufficiently obtained in some cases. Meanwhile, if the content of the water-soluble organic solvent is more than 50.0% by mass, poor supply of the ink may occur due to an increase in the viscosity of the ink.

Other Components

The first ink may contain water-soluble organic compounds, e.g., urea or derivatives thereof, trimethylol propane, and trimethylol ethane, that are solid at a temperature of 25° C. in addition to the above-described components. Also, the first ink may contain various additives, e.g., a pH adjuster, a debubbling agent, a rust inhibitor, a preservative, a fungicide, an antioxidant, a reducing inhibitor, and a chelating agent, as necessary.

Physical Properties of First Ink

The viscosity (mPa·s) at a temperature of 25° C. of the first ink is preferably 1 mPa·s or more to 5 mPa·s or less, and further preferably 1 mPa·s or more to 3 mPa·s or less. The surface tension (mN/m) at a temperature of 25° C. of the first ink is preferably 10 mN/m or more to 60 mN/m or less, more preferably 20 mN/m or more to 60 mN/m or less, and further preferably 30 mN/m or more to 40 mN/m or less. The surface tension of the ink may be adjusted by appropriately determining the type and the content of the surfactant in the ink.

Second Ink

The second ink is an aqueous ink containing a dye. The components constituting the second ink will be described below.

Dye

There is no particular limitation regarding the dye as long as the dye is an anionic dye that is used as a coloring material of a common inkjet ink. In particular, the dye can be a compound having at least one selected from the group consisting of an azo skeleton, a phthalocyanine skeleton, an anthrapyridone skeleton, and a xanthene skeleton. Further, the dye can be dissolved into the ink from the viewpoint of reliability of the ink and be readily agglomerated in the printing medium from the viewpoint of color developability of an image. A balance between the solubility into the ink and an agglomeration property in the printing medium may be adjusted by the type of the skeleton of the dye, the number of anionic groups, and the like.

The content (% by mass) of the dye in the second ink is preferably 1.0% by mass or more to 10.0% by mass or less, and further preferably 2.0% by mass or more to 8.0% by mass or less.

Aqueous Medium

The second ink is an aqueous ink containing water as an aqueous medium. The aqueous medium may further contain a water-soluble organic solvent. Deionized water (ion-exchanged water) can be used as the water. There is no particular limitation regarding the water-soluble organic solvent, and any one of solvents, e.g., alcohols, glycols, alkylene glycols, polyethylene glycols, nitrogen-containing compounds, and sulfur-containing compounds, usable for an inkjet ink may be used. At least one of these water-soluble organic solvents may be included in the ink.

The content (% by mass) of the water in the second ink is preferably 50.0% by mass or more to 95.0% by mass or less with reference to the total mass of the ink. The content (% by mass) of water-soluble organic solvent in the second ink is preferably 3.0% by mass or more to 50.0% by mass or less with reference to the total mass of the second ink. If the content of the water-soluble organic solvent is less than 3.0% by mass, when the ink is used for an inkjet printing apparatus, reliability, e.g., sticking resistance, is not sufficiently obtained in some cases. Meanwhile, if the content of the water-soluble organic solvent is more than 50.0% by mass, poor supply of the ink may occur.

Other Components

The second ink may contain water-soluble organic compounds, e.g., urea or derivatives thereof, trimethylol propane, and trimethylol ethane, that are solid at ambient temperature (temperature of 25° C.) in addition to the above-described components. Also, the second ink may contain various additives, e.g., a surfactant, a resin, a pH adjuster, a debubbling agent, a rust inhibitor, a preservative, a fungicide, an antioxidant, a reducing inhibitor, and a chelating gent, as necessary.

Physical Properties of Second Ink

The viscosity (mPa·s) at a temperature of 25° C. of the second ink is preferably 1 mPa·s or more to 5 mPa·s or less, and further preferably 1 mPa·s or more to 3 mPa·s or less. The surface tension (mN/m) at a temperature of 25° C. of the second ink is preferably 10 mN/m or more to 60 mN/m or less, more preferably 20 mN/m or more to 60 mN/m or less, and further preferably 30 mN/m or more to 40 mN/m or less. The surface tension of the second ink may be adjusted by appropriately determining the type and the content of the surfactant in the second ink.

Printing Medium

The printing medium includes an ink-receiving layer. The ink-receiving layer contains at least one cationic compound selected from the group consisting of a polyvalent metal salt and a salt of a cationic resin. The ink-receiving layer is usually disposed on a substrate.

Substrate

Regarding a substrate, paper provided with a resin layer can be used. The resin layer may be disposed on one surface of the paper or on both surfaces of the paper. Examples of the paper provided with the resin layer include paper provided with a resin layer containing a thermoplastic resin. Examples of the thermoplastic resin include acrylic resins, acrylic silicone resins, polyolefin resins, and styrene-butadiene copolymers. In particular, the thermoplastic resins can be polyolefin resins. Examples of the polyolefin resins include polyethylenes, polypropylenes, and polyisobutylenes. In particular, the polyolefin resins can be polyethylenes. The polyethylenes can be low-density polyethylenes (LDPE) and high-density polyethylenes (HDPE). The resin layer may contain a white pigment, a fluorescent whitening agent, ultramarine blue, and the like for the purpose of adjusting opacity, whiteness, hue, and the like. In particular, the white pigment can be included for the purpose of improving the opacity. Examples of white pigment include titanium oxide. The content (% by mass) of the white pigment in the resin layer is preferably 25.0% by mass or less. Examples of the paper include paper produced by paper making of wood pulp serving as a main raw material to which synthetic pulp, e.g., polypropylene, or a synthetic resin, e.g., nylon or polyester, is added as necessary. Examples of wood pulp include leaf bleached kraft pulp (LBKP) and needle bleached kraft pulp (NBKP). The thickness (μm) of the substrate is preferably 50 μm or more to 400 μm or less.

Ink-Receiving Layer

The ink-receiving layer may be a single layer or a multilayer composed of at least two layers. The ink-receiving layer may be disposed on one surface of the substrate or on both surfaces of the substrate.

The ink-receiving layer can contain chloride ions. Chloride ions may be included as counter ions to a polyvalent metal salt in the ink-receiving layer. When chloride ions are included, fusion of silver particles with each other is facilitated so as to form a denser silver layer by a mechanism described below. When the ink-receiving layer contains chloride ions, silver chloride is formed by a reaction between chloride ions and ionized silver (silver ions) on the surfaces of silver particles. Fusion of silver particles with each other is facilitated while silver chloride serves as a core so as to form a denser silver layer. Consequently, the dye is readily retained in the silver layer so as to improve color developability of an image.

However, it was found that, when images printed on the ink-receiving layer having chloride ions were exposed to light or gas e.g., nitrogen oxides, a silver layer was degraded gradually, and the glossiness of the image was degraded. This is because silver chloride is excessively formed by the reaction between chloride ions and silver ions and, thereby, the silver layer is whitened due to silver chloride.

Therefore, the ink-receiving layer can contain chloride ions and at least one selected from the group consisting of a chloride-ion capture agent and an organic antioxidant. The chloride-ion capture agent suppresses formation of silver chloride by the reaction between chloride ions and silver ions. When the ink-receiving layer contains the chloride-ion capture agent, the capture agent attaches to the surfaces of silver particles and, thereby, silver ions do not readily react with chloride ions. Consequently, silver chloride is not readily and excessively formed, whitening of the silver layer due to silver chloride is suppressed, and degradation in glossiness of the image is suppressed. When the ink-receiving layer contains an organic antioxidant, ionization (reducing) of silver particles is suppressed. As a result, silver chloride is not readily and excessively formed, whitening of the silver layer due to silver chloride is suppressed, and degradation in glossiness of the image is suppressed.

Chloride-Ion Capture Agent

The chloride-ion capture agent can be 1,2,3-benzotriazole and derivatives thereof. Examples of derivatives of 1,2,3-benzotriazole include 1-(methoxymethyl)-1H-benzotriazole and 1-(hydroxymethyl)-1H-benzotriazole.

The content ($g/m^2$) of the chloride-ion capture agent per unit area of the ink-receiving layer is preferably 0.02 $g/m^2$ or more to 0.15 $g/m^2$ or less. If the content is less than 0.02 $g/m^2$, the amount of the chloride-ion capture agent is small, the capture agent is not readily attached to the surfaces of silver particles and, as a result, silver ions readily react with chloride ions. Consequently, silver chloride tends to be excessively formed, whitening of the silver layer due to silver chloride is facilitated, and degradation in glossiness of the image is not sufficiently suppressed in some cases. If the content is more than 0.15 $g/m^2$, the amount of the capture agent is large, the capture agent is readily attached to the surfaces of silver particles and, as a result, silver ions do not readily react with chloride ions. Consequently, silver chloride tends not to be excessively formed, whitening of the silver layer due to silver chloride is suppressed, and degradation in glossiness of the image is suppressed. However, fusion of silver particles does not readily occur due to capture agent attached to the surfaces of the silver particles. As a result, a dense silver layer is not readily formed, and glossiness of the image is not sufficiently obtained in some cases. Further, gaps are readily generated between silver particles due to capture agent attached to the surfaces of the silver particles. Therefore, the dye permeates between silver particles, and color developability of the image is not sufficiently obtained in some cases.

Organic Antioxidant

The organic antioxidant can be ascorbic acid or a salt thereof. Examples of cations constituting the salt of ascorbic acid include ions of alkali metals, e.g., sodium and potassium, and ions of alkaline earth metals, e.g., magnesium and calcium.

The content ($g/m^2$) of the organic antioxidant per unit area of the ink-receiving layer is preferably 0.05 $g/m^2$ or more to 0.25 $g/m^2$ or less. If the content is less than 0.05 $g/m^2$, ionization of silver particles is not readily suppressed, silver chloride tends to be excessively formed, and degradation in glossiness of the image is not sufficiently suppressed in some cases. If the content is more than 0.25 $g/m^2$, the organic capture agent is readily present near the silver particles. As a result, fusion of silver particles does not readily occur, a dense silver layer is not readily formed, and glossiness of the image is not sufficiently obtained in some cases. Further, if the amount of the organic antioxidant is large, the printing medium becomes yellowish and, thereby, color developability of the image is not sufficiently obtained in some cases.

Inorganic Particles

The ink-receiving layer can contain inorganic particles. The average primary particle diameter of the inorganic particles is preferably 150 nm or less, more preferably 1 nm or more to 100 nm or less, and further preferably 3 nm or more to 30 nm or less. The average primary particle diameter of the inorganic particles refers to a number average particle diameter of circles having areas equal to projected areas of primary particles of inorganic particles when observed by an electron microscope. In this regard, measurements are performed at 100 or more points.

The inorganic particles in a state of being dispersed by a dispersant can be used for a coating solution for forming the ink-receiving layer (hereafter referred to as a "first coating solution"). The average secondary particle diameter of the inorganic particles in the dispersed state is preferably 0.1 nm or more to 500 nm or less, more preferably 1 nm or more to 300 nm or less, and further preferably 10 nm or more to 250 nm or less. In this regard, the average secondary particle diameter of the inorganic particles in the dispersed state may be measured by a dynamic light scattering method.

The content (% by mass) of inorganic particles in the ink-receiving layer is preferably 50.0% by mass or more to 98.0% by mass or less, and further preferably 70.0% by mass or more to 96.0% by mass or less with reference to the total mass of the ink-receiving layer.

The amount of inorganic particles applied ($g/m^2$) when the ink-receiving layer is formed is preferably 8 $g/m^2$ or more to 45 $g/m^2$ or less. When the amount is within the above-described range, the ink-receiving layer readily has a favorable film thickness.

Examples of inorganic particles include alumina hydrates, alumina, silica, colloidal silica, and titanium dioxide. These inorganic particles may be used alone or in combination of at least two types, as necessary. In particular, alumina hydrates, alumina, and silica that may form a porous structure having high ink absorbency can be used for the inorganic particles.

The alumina hydrate can be a boehmite-type alumina hydrate or an amorphous alumina hydrate. The alumina can be fumed alumina. Examples of fumed alumina include γ-alumina, α-alumina, δ-alumina, θ-alumina, and χ-alumina. In particular, γ-alumina can be used for the fumed alumina from the viewpoint of optical density of the image and ink absorbency.

The alumina hydrate and alumina in a form of water dispersion can be mixed into the first coating solution, and an acid can be used as a dispersant thereof. Regarding the acid, a compound denoted by R—$SO_3H$ can be used because an effect of suppressing bleeding of an image is exerted. In the formula, R represents a hydrogen atom, an alkyl group having a carbon number of 1 or more to 4 or less, or an alkenyl group having a carbon number of 1 or more to 4 or less. In this regard, R may have an oxo group, a halogen atom, an alkoxy group, or an acyl group as a substituent.

The content of the acid is preferably 1.0% by mass or more to 2.0% by mass or less, and further preferably 1.3% by mass or more to 1.6% by mass or less with reference to the total content of the alumina hydrate and alumina.

Methods for producing silica that is used for the ink-receiving layer are roughly divided into a wet method and a dry method (vapor phase method). Regarding the wet method, a method in which active silica is generated by acidolysis of a silicate and the resulting active silica is appropriately polymerized, agglomerated, and precipitated so as to produce hydrous silica is known. Meanwhile, regarding the dry method (vapor phase method), a method in which high-temperature vapor phase hydrolysis of silicon halide is used (flame hydrolysis method) and a method in which silica sand and coke are subjected to heat-reducing and evaporation by arc in an electric furnace and are oxidized by air (arc method) are known as the methods for producing anhydrous silica. Silica produced by the dry method (vapor phase method) can be used (hereafter also referred to as "fumed silica"). The fumed silica has particularly high ink absorbency because of particularly large specific surface area and has a capability of providing transparency to the ink-receiving layer because of low refractive index. Consequently, good color developability is obtained.

The alumina hydrate, alumina, and silica may be used in combination. Specifically, there is a method in which at least two selected from the group consisting of the alumina hydrate, alumina, and silica in a state of a powder are mixed and dispersed so as to prepare a dispersion liquid. The alumina hydrate and fumed silica can be used in combination as the inorganic particles.

Binder

The ink-receiving layer can contain a binder. The binder refers to a material capable of binding inorganic particles so as to form a film.

The content of the binder in the ink-receiving layer is preferably 0.50 times or less, and further preferably 0.30 times or less the content of the inorganic particles in a mass ratio from the viewpoint of ink absorbency. The mass ratio is preferably 0.05 times or more, and further preferably 0.08 times or more from the viewpoint of binding property of the ink-receiving layer.

Examples of the binder include a polymer cationized by using a cationic group; a polymer having a surface cationized by using a cationic surfactant; a polymer produced by polymerizing a monomer that constitutes the polymer in a cationic polyvinyl alcohol so as to distribute polyvinyl alcohol on the surface of the polymer; a polymer produced by polymerizing a monomer that constitutes the polymer in a suspension-dispersion liquid of cationic colloidal particles so as to distribute cationic colloidal particles on the surface of the polymer; an aqueous binder, for example, a thermosetting resin, e.g., a melamine resin or a urea resin; and a synthetic resin, e.g., a polymer or copolymer of an acrylic acid ester or methacrylic acid ester such as polymethyl methacrylate. At least one of these binders may be used as necessary.

Among the above-described binders, polyvinyl alcohol and derivatives thereof can be used because a transparent film is formed. Examples of polyvinyl alcohol derivatives include cation-modified polyvinyl alcohols, anion-modified polyvinyl alcohols, silanol-modified polyvinyl alcohols, and polyvinyl acetals.

When the first coating solution is prepared, the polyvinyl alcohol or a derivative thereof can be used as an aqueous solution. At that time, the content of the polyvinyl alcohol or a derivative thereof is preferably 3.0 by mass or more to 20.0% by mass or less with reference to the total mass of the first coating solution.

Crosslinking Agent

In order to enhance the water resistance of the ink-receiving layer, the ink-receiving layer can contain a crosslinking agent. Examples of crosslinking agents include zirconium-based compounds, amide-based compounds, aluminum-based compounds, boric acids, and borates. At least one of these crosslinking agents may be used as necessary. In particular, when the polyvinyl alcohol or a derivative thereof is used as the binder, the boric acids or borates can be used among the above-described crosslinking agents. The polyvinyl alcohol or a derivative thereof has high hydrophilicity, hydroxy groups included in the polyvinyl alcohol or a derivative thereof react with water in the ink, and swelling occurs. Consequently, ink absorbency may be degraded. Even if the ink-receiving layer contains the polyvinyl alcohol or a derivative thereof, when the ink-receiving layer contains the crosslinking agent, hydroxy groups react with the crosslinking agent rather than water in the ink and, as a result, degradation of the ink absorbency is suppressed.

The ink-receiving layer can contain the polyvinyl alcohol or a derivative thereof and the crosslinking agent, and the content of the crosslinking agent in the ink-receiving layer is preferably 0.40 equivalent or more to 1.00 equivalent or less relative to the content of the polyvinyl alcohol or a derivative thereof. Consequently, color developability and glossiness of the image are further enhanced. In this regard, the right amount of the crosslinking agent that theoretically reacts with hydroxy groups included in the polyvinyl alcohol or a derivative thereof is assumed to be 1.00 equivalent. If the amount of the crosslinking agent is less than 0.40 equivalent, the crosslinking agent is smaller amount than the polyvinyl alcohol or a derivative thereof, and the polyvinyl alcohol or a derivative thereof is swelled. As a result, even when the ink containing silver particles is applied, water in the ink is not readily absorbed, the silver particles are not readily fused and, thereby, a dense silver layer is not readily formed. Consequently, color developability and glossiness of the image are not sufficiently obtained in some cases. If the amount of the crosslinking agent is more than 1.00 equivalent, a liquid component in the ink is not readily absorbed because the crosslinking agent is excessively present relative to the polyvinyl alcohol. As a result, the silver particles are not readily fused and, thereby, a dense silver layer is not readily formed. Consequently, color developability and glossiness of the image are not sufficiently obtained in some cases.

Examples of boric acids include orthoboric acid ($H_3BO_3$), metaboric acid, and diboric acid. The borates can be water-soluble salts of the boric acids. Examples of borates include alkali metal salts of boric acids, e.g., sodium salts and potassium salts of boric acids; alkaline earth metal salts of boric acids, e.g., magnesium salts and calcium salts of boric acids; and ammonium salts of boric acids. In particular, orthoboric acid can be used from the viewpoint of stability with time of the first coating solution and an effect of suppressing generation of cracks.

The amount of crosslinking agent used is appropriately adjusted in accordance with the production condition and the like. The content of the crosslinking agent in the ink-receiving layer is preferably 1.0% by mass or more to 50.0% by mass or less, and further preferably 5.0% by mass or more to 40.0% by mass or less with reference to the content of the binder.

Cationic Compound

The cationic compound is at least one selected from the group consisting of a polyvalent metal salt and a salt of a cationic resin. The molecular weight of the salt of a cationic resin is preferably 1,000 or more to 100,000 or less. The amine value of the salt of a cationic resin is preferably 50 mgKOH/g or more, and more preferably 300 mgKOH/g or more.

The polyvalent metal salt can be at least one selected from the group consisting of (i) a salt of an ion of at least one polyvalent metal selected from the group consisting of iron, aluminum, and zirconium and at least one anion selected from the group consisting of acetate ion, chloride ion, and sulfate ion and (ii) polyaluminum chloride. Examples of salts of an ion of at least one polyvalent metal selected from the group consisting of iron, aluminum, and zirconium and at least one anion selected from the group consisting of acetate ion, chloride ion, and sulfate ion include zirconium acetate, aluminum chloride, aluminum sulfate, iron(II) sulfate, and zirconium chloride. In particular, the polyvalent metal salt can be at least one selected from the group consisting of aluminum chloride, aluminum sulfate, iron(II) sulfate, and polyaluminum chloride.

The salt of a cationic resin can be at least one selected from the group consisting of a nitrate of a resin having any one of primary to quaternary amine structures, a sulfate of a resin having any one of primary to quaternary amine structures, and a cationic compound having a group denoted by a general formula (1) described below,

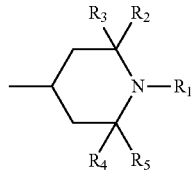

general formula (1)

(in general formula (1), $R_1$ represents a hydrogen atom or an alkyl group having a carbon number of 1 or more to 30 or less, and each of $R_2$, $R_3$, $R_4$, and $R_5$ represents an alkyl group having a carbon number of 1 or more to 6 or less).

Examples of the nitrate of a resin having any one of primary to quaternary amine structures include a nitrate of polyallylamine. Examples of the sulfate of a resin having any one of primary to quaternary amine structures include a sulfate of dicyandiamide/diethylenetriamine resin. The cationic compound denoted by general formula (1) is commercially available as "hindered amine" and examples thereof include ADK STAB LA63P and LA-68 (produced by ADEKA Corporation). In particular, the salt of a cationic resin can be at least one selected from the group consisting of a nitrate of polyallylamine and ADK STAB LA63P.

The force for agglomerating silver particles or dye is preferably 30% or more. When light is applied to a sample solution, the light is absorbed by a substance in the solution and, thereby, the light passed through the solution is weakened. The intensity of the light applied to a solution is assumed to be $I_0$, and the intensity of the light passed through the solution is assumed to be I. The transmittance T is represented by $I/I_0$, and the absorbance K is represented by $-Log_{10}T$. Therefore, as the amount of the light absorbed increases (the value of the transmittance T is small), the absorbance K increases, and as the amount of the light absorbed decreases (the value of the transmittance T is large), the absorbance K decreases.

The absorbance of liquid 1 containing 10.0% by mass of silver particles is assumed to be $K_a$, and the absorbance of liquid 3 in which liquid 1 described above and liquid 2 containing 1.0% by mass of cationic compound are mixed is assumed to be $K_b$. Usually, a dispersant does not have a large influence on the absorbance. Therefore, when a dispersant for dispersing silver particles is necessary, the dispersant may be used in preparation of liquid 1. Both $K_a$ and $K_b$ are values at a wavelength of 420 nm. When the light passes the first ink containing silver particles, the light is absorbed by the silver particles and, thereby, the value of $K_a$ is large. However, when the light passes a mixture of the cationic compound and the first ink containing silver particles, the silver particles are agglomerated and precipitated by the cationic compound, the light is not readily absorbed by the silver particles and, thereby, the value of $K_b$ is small. Therefore, an indicator that shows the degree of agglomeration of silver particles (force for agglomerating silver particles (%)) caused by the cationic compound in the first ink is represented by $(K_a-K_b)/K_a \times 100$. In this regard, the absorbance K is measured by using a spectrophotometer.

Examples of cationic compound having a force for agglomerating silver particles of 30% or more include zirconium chloride (60%), iron(II) sulfate (96%), aluminum chloride (99%), aluminum sulfate (99%), and ADK STAB LA63P (92%). The value in parentheses is an agglomeration force measured by using silver particle dispersion liquid 1 prepared in an example described below. In particular, the cationic compound has a force for agglomerating silver particles of preferably 60% or more.

Likewise, the absorbance of liquid 4 containing 5.0% by mass of dye is assumed to be $K_c$, and the absorbance of liquid 5 in which liquid 4 described above and liquid 2 containing 1.0% by mass of cationic compound are mixed is assumed to be $K_d$. Both $K_c$ and $K_d$ are values at a maximum absorption wavelength $\lambda_{max}$ of the dye (a value at a wavelength of 500 nm in the case of a black dye). When the light passes the second ink containing the dye, the light is absorbed by the dye and, thereby, the value of $K_c$ is large. However, when the light passes a mixture of the cationic compound and the second ink containing the dye, the dye is agglomerated and precipitated by the cationic compound, the light is not readily absorbed by the dye and, thereby, the value of $K_d$ is small. Therefore, an indicator that shows the degree of agglomeration of dye (force for agglomerating dye (%)) caused by the cationic compound in the second ink is represented by $(K_c-K_d)/K_c \times 100$. In this regard, the absorbance K is measured by using a spectrophotometer.

Examples of cationic compound having a force for agglomerating dye of 30% or more include aluminum chloride (30%), zirconium acetate (55%), a sulfate of dicyandiamide/diethylenetriamine resin (65%), polyaluminum chloride (90%), and a nitrate of polyallylamine (96%). The value in parentheses is an agglomeration force measured by using cationic compound 2 prepared in an example described below. In particular, the cationic compound has a force for agglomerating dye of preferably 60% or more.

The content (g/m$^2$) of the cationic compound per unit area of the ink-receiving layer is 0.20 g/m$^2$ or more. The content is further preferably 0.70 g/m$^2$ or more. In addition, the content is preferably 5.00 g/m$^2$ or less. If the content is more than 5.00 g/m$^2$, ink absorbency is reduced, water in the ink retains in the printing medium. Consequently, the silver particles are not readily fused with each other, and the glossiness of the image is not sufficiently obtained in some cases.

Other Additives

The ink-receiving layer may contain other additives in addition to the additives described above. Specific examples of the additives include a pH adjuster, a thickener, a mold release agent, a fluorescent whitening agent, an ultraviolet absorber, a preservative, a fungicide, a water-resistant agent, and a curing agent.

Physical Properties of Printing Medium

The paper surface pH of the printing medium is preferably 6.0 or less. The paper surface pH of the printing medium refers to the pH of the ink-receiving layer. If the paper surface pH is higher than 6.0, the amount of hydroxide ions is large and, as a result, hydroxide ions react with ionized silver (silver ions) on the surfaces of silver particles so as to form silver oxide ($Ag_2O$). Silver particles are not readily fused with each other due to the resulting silver oxide and, thereby, a dense silver layer is not readily formed. Consequently, color developability and glossiness of the image are not sufficiently obtained in some cases.

The paper surface pH of the printing medium may be measured on the basis of JAPAN TAPPI No. 49-1 "Paper and Cardboard-Surface pH Testing method-Part 1: Glass electrode method".

Method for Producing Printing Medium

The method for producing a printing medium can include the steps of preparing a first coating solution and coating a substrate with the first coating solution. Further, the step of coating the substrate with a liquid containing a cationic compound and at least one of a chloride-ion capture agent and an organic antioxidant (hereafter referred to as a "second coating solution") can be included. The method for producing the printing medium will be described below.

Examples of the method for forming the ink-receiving layer on the substrate include a method described below. Initially, the first coating solution is prepared. Subsequently, the substrate is coated with the first coating solution, and the substrate coated with the first coating solution is dried. Further, in order to include the cationic compound, the chloride-ion capture agent, and the organic antioxidant into the ink-receiving layer, the second coating solution is applied, and the substrate coated with the second coating solution is dried. As a result, the printing medium is produced. Regarding the method for applying the first coating solution and the second coating solution, a curtain coater, a coater that adopts an extrusion system, a coater that adopts a slide hopper system, and the like may be used. The first coating solution and the second coating solution may be heated during coating. Examples of drying methods after coating include methods in which hot-air dryers, e.g., a linear tunnel dryer, an arch dryer, an air loop dryer, and a sign-curve air float dryer, are used and methods in which dryers that use infrared rays, a heating dryer, microwaves, and the like are used.

Denseness of Silver Layer Formed

The denseness of the silver layer formed on the printing medium is a value obtained by observing a cross section of the printing medium by a scanning electron microscope (SEM). The denseness of the silver layer with no pore is defined as 100%. Therefore, as the number of pores in the silver layer increases, the denseness of the silver layer decreases.

When the ink-receiving layer included in the printing medium contains zirconium chloride, iron(II) sulfate, aluminum chloride, aluminum sulfate, or ADK STAB LA63P, the denseness of the silver layer formed on the printing medium is preferably 75% or more. If the denseness of the silver layer is less than 75%, the dye in the second ink and the water enter between silver particles and further permeate into the printing medium. As a result, it is difficult to retain the dye in the silver layer, and color developability of the image is not sufficiently obtained in some cases. The denseness of the silver layer is more preferably 90% or more, and further preferably 96% or less.

When the ink-receiving layer included in the printing medium contains aluminum chloride, zirconium acetate, a sulfate of dicyandiamide/diethylenetriamine resin, polyaluminum chloride, or a nitrate of polyallylamine, the denseness of the silver layer is preferably 90% or less. If the denseness of the silver layer is more than 90%, the cationic compound does not readily enter the printing medium and, thereby, the dye in the second ink does not readily react with the cationic compound included in the printing medium. As a result, it is difficult to retain the dye in the printing medium, and color developability of the image is not sufficiently obtained in some cases. The denseness of the silver layer is more preferably 75% or less, and further preferably 50% or more.

EXAMPLES

The present disclosure will be described below in further detail with reference to the examples and the comparative examples, but the present invention is not limited to the examples described below within the bounds of not departing from the gist of the present disclosure. In this regard, the amount of the component expressed in "part" or "%" is on a mass basis, unless otherwise specified.

Production of Printing Medium

Production of Substrate 1

Paper stock was produced by mixing 80 parts of leaf bleached kraft pulp (LBKP) having Canadian standard freeness of 450 mL CSF, 20 parts of needle bleached kraft pulp (NBKP) having Canadian standard freeness of 480 mL CSF, 0.60 parts of cationized starch, 10 parts of calcium carbonate heavy, 15 parts of precipitated calcium carbonate light, 0.10 parts of alkylketene dimer, and 0.03 parts of cationic polyacrylamide, and adding water so as to adjust the solid content thereof to 3.0%. Subsequently, the paper stock was made into a sheet by a foundrinier paper machine, three-step wet pressing was performed, and drying was performed by a multicylinder dryer. Thereafter, the resulting sheet was impregnated with an oxidized starch aqueous solution by a size press machine so as to adjust the solid content after drying to 1.0 $g/m^2$, and drying was performed. Further, machine calender finishing was performed so as to produce base paper having a basis weight of 170 $g/m^2$, Stockigt sizing degree of 100 seconds, an air permeability of 50 seconds, Beck smoothness of 30 seconds, Gurley stiffness of 11.0 mN, and a film thickness of 100 μm. Subsequently, one surface of the base paper was coated with a resin composition composed of 70 parts of low density polyethylene (LDPE), 20 parts of high density polyethylene (HDPE), and 10 parts of titanium oxide so as to adjust the dry coating amount to 25 $g/m^2$. This surface was referred to as a substrate surface. The other surface of the base paper was coated with low density polyethylene so as to produce substrate 1.

Production of Substrate 2

A raw material for paper making was prepared by adding 20.0 parts of precipitated calcium carbonate light to a slurry of 100.0 parts of leaf bleached kraft pulp, adding 2.0 parts of cationic starch and 0.3 parts of alkenyl succinic anhydride-based neutral sizing agent, and performing mixing sufficiently. Base paper having a basis weight of 110 g/m² was produced by performing drying by using a foundrinier multicylinder paper machine so as to adjust the water content to 10%, coating both surfaces with a 7-% solution of oxidized starch powder in the total amount of 4 g/m² by a size press, and performing drying so as to adjust the water content to 7%. Substrate 2 was produced by subjecting both the surface and the back surface of the base paper to melt extrusion coating with a resin composition composed of 70 parts of high density polyethylene and 20 parts of low density polyethylene in a coating amount of 30 g/m² per surface.

Production of Ink-Receiving Layer Coating Solution

Preparation of Inorganic Particle Dispersion Liquid 1

After 40.0 g of alumina hydrate (DISPERAL HP14, produced by Sasol) and 0.6 g of methanesulfonic acid were added to 160.0 g of pure water, agitation was performed for 30 minutes by a mixer so as to prepare inorganic particle dispersion liquid 1 containing 20.0% of alumina hydrate that is inorganic particles. The average primary particle diameter of the alumina hydrate in the inorganic particle dispersion liquid was 130 nm.

Preparation of Inorganic Particle Dispersion Liquid 2

After 2 parts of acetic acid was added to 498 parts of ion-exchanged water, 100 parts of alumina hydrate (DISPERAL HP14, produced by Sasol) was added little by little to the resulting acetic acid aqueous solution while agitation was performed by a homomixer (T. K. HOMOGENIZING MIXER MARK II Model 2.5, produced by Tokushu Kika Kogyo Co., Ltd.) under a rotation condition of 3,000 rpm. Subsequently, agitation was performed for 30 minutes. As a result, the alumina hydrate was dispersed by acetic acid, and inorganic particle dispersion liquid 2 containing 23.0% of alumina hydrate was prepared.

Preparation of Inorganic Particle Dispersion Liquid 3

After 4 parts of cationic polymer (SHALLOL DC902P, produced by Dai-ichi Kogyo Seiyaku Co., Ltd.) was added to 333 parts of ion-exchanged water, 100 parts of fumed silica (AEROSIL300, produced by EVONIK) was added little by little to the resulting cationic polymer aqueous solution while agitation was performed by a homomixer (T. K. HOMOGENIZING MIXER MARK II Model 2.5, produced by Tokushu Kika Kogyo Co., Ltd.) under a rotation condition of 3,000 rpm. Subsequently, the resulting solution was diluted with ion-exchanged water, and fumed silica was made into fine particles by being processed two times with a high-pressure homogenizer (Nanomizer, produced by YOSHIDA KIKAI CO., LTD.) so as to produce inorganic particle dispersion liquid 3 containing 20.0% of fumed silica was prepared.

Preparation of First Coating Solution 1

A polyvinyl alcohol aqueous solution having a solid content of 8.0% was produced by dissolving polyvinyl alcohol (PVA235, produced by Kuraray Co., Ltd., polymerization degree: 3,500, saponification degree: 88%) into ion-exchanged water. Subsequently, the polyvinyl alcohol aqueous solution was mixed into inorganic particle dispersion liquid 1 such that the content of polyvinyl alcohol became 10.0% relative to the content of inorganic particles. Further, orthoboric acid serving as a crosslinking agent was dissolved into ion-exchanged water so as to produce a boric acid aqueous solution containing 3.0% of orthoboric acid. First coating solution 1 was produced by mixing the boric acid aqueous solution such that the content of boric acid became 1.0% relative to the content of inorganic particles.

Preparation of First Coating Solutions 2 to 6

A polyvinyl alcohol aqueous solution containing 8.0% of polyvinyl alcohol was produced by dissolving polyvinyl alcohol (PVA235, produced by Kuraray Co., Ltd., polymerization degree: 3,500, saponification degree: 88%) into ion-exchanged water. Further, orthoboric acid serving as a crosslinking agent was dissolved into ion-exchanged water so as to produce a boric acid aqueous solution containing 3.0% of orthoboric acid. First coating solutions 2 to 6 were produced by using these aqueous solutions so as to have contents (part) described in Table 1.

The method for calculating the content (equivalent) of the crosslinking agent relative to polyvinyl alcohol or an additive thereof will be described with reference to first coating solution 2. Orthoboric acid is used as the crosslinking agent, a maximum coordination number of boron is 4 and, therefore, boron may react with four hydroxy groups included in the polyvinyl alcohol. Consequently, in order that orthoboric acid reacts with polyvinyl alcohol without excess or deficiency, a formula, the number of moles of hydroxy groups included in polyvinyl alcohol×the content (equivalent) of orthoboric acid relative to polyvinyl alcohol=4×the number of moles of orthoboric acid has to apply. Therefore, the content (equivalent) of orthoboric acid relative to polyvinyl alcohol is calculated from 4×the number of moles of orthoboric acid/the number of moles of hydroxy groups included in polyvinyl alcohol.

The basic structure of the polyvinyl alcohol is $—(CH_2—CH(OH))_m—(CH_2—CH(OCOCH_3))_n—$. The saponification degree (%) of the polyvinyl alcohol is $m/(m+n)\times 100$ and indicates the proportion of $CH_2—CH(OH)$ in the polyvinyl alcohol. The saponification degree of the polyvinyl alcohol used for first coating solution 2 is 88%, the molecular weight (g/mol) of $CH_2—CH(OH)$ is 44.00, and the molecular weight (g/mol) of $CH_2—CH(OCOCH_3)$ is 86.00. Consequently, the number of moles of hydroxy groups included in the polyvinyl alcohol is $11.00/\{(44.00\times 88/100)+86.00\times(100-88)/100\}\times 88/100$. The molecular weight (g/mol) of orthoboric acid is 61.83 and, therefore, the number of moles of orthoboric acid is 1.01/61.83. The content (equivalent) of orthoboric acid relative to the polyvinyl alcohol is calculated from these values.

TABLE 1

Preparation and characteristics of first coating solutions 2 to 6

| | Alumina hydrate in inorganic particle dispersion liquid 2 (part) | Fumed silica in inorganic particle dispersion liquid 3 (part) | Polyvinyl alcohol (part) | Crosslinking agent (part) | Content of crosslinking agent relative to polyvinyl alcohol (equivalent) |
|---|---|---|---|---|---|
| First coating solution 2 | 50.00 | 50.00 | 11.00 | 1.01 | 0.33 |
| First coating solution 3 | 50.00 | 50.00 | 11.00 | 1.22 | 0.40 |

TABLE 1-continued

Preparation and characteristics of first coating solutions 2 to 6

|  | Alumina hydrate in inorganic particle dispersion liquid 2 (part) | Fumed silica in inorganic particle dispersion liquid 3 (part) | Polyvinyl alcohol (part) | Crosslinking agent (part) | Content of crosslinking agent relative to polyvinyl alcohol (equivalent) |
|---|---|---|---|---|---|
| First coating solution 4 | 50.00 | 50.00 | 11.00 | 2.04 | 0.67 |
| First coating solution 5 | 50.00 | 50.00 | 11.00 | 3.05 | 1.00 |
| First coating solution 6 | 50.00 | 50.00 | 11.00 | 3.51 | 1.15 |

The substrate was coated with the resulting first coating solution so as to adjust the dry coating amount (g/m$^2$) to 25 g/m$^2$, and drying was performed by hot air at a temperature of 90° C. so as to produce an ink-receiving layer. Subsequently, in order to make the resulting ink-receiving layer include a cationic compound and at least one of a chloride ion capture agent and an organic antioxidant, second coating solutions described in Tables 2 to 4 were prepared. The ink-receiving layers were coated with the second coating solutions, and drying was performed by hot air at a temperature of 90° C. so as to produce printing media. The combination of substrate, the first coating solution and the second coating solution is described in Tables 5 to 7. The content (g/m$^2$) of chloride ions per unit area of ink-receiving layer of printing medium 1 was 0.00 g/m$^2$, and the content (g/m$^2$) of chloride ions per unit area of each of ink-receiving layer of printing media 2 to 58 was 0.20 g/m$^2$. The paper surface pH of printing medium 18 was 6.0, and the paper surface pH of printing medium 19 was 7.0. The paper surface pH of printing media 1 to 17 and 20 to 58 was 4.2. The paper surface pH of the printing medium was a value measured on the basis of JAPAN TAPPI No. 49-1 "Paper and Cardboard-Surface pH Testing method-Part 1: Glass electrode method" where an electrode set time was 30 seconds.

TABLE 2

Composition of second coating solution

| | Second coating solution No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Hindered amine LA-63P | | | | | | | | | | | | | 10.00 | | 10.00 | 10.00 | 10.00 |
| Aluminum sulfate | | | | | | | | | | | | | | | | | |
| Aluminum chloride | | | | | | | | | | | | | | | | | |
| Iron(II) sulfate | | | | | | | | | | | | | | | | | |
| Zirconium chloride | | | | | | | | | | | | | | 10.00 | | | |
| Nitrate of polyallylamine | 10.00 | 10.00 | 10.00 | 10.00 | 10.00 | 10.00 | 10.00 | 10.00 | 10.00 | 10.00 | 10.00 | 10.00 | | | | | |
| Polyaluminum chloride | | | | | | | | | | | | | | | | | |
| Sulfate of DCDA/DETA | | | | | | | | | | | | | | | | | |
| Zirconium acetate | | | | | | | | | | | | | | | | | |
| Aluminum chloride | | | | | | | | | | | | | | | | | |
| Polyvinyl pyrrolidone | | | | | | | | | | | | | | | | | |
| 1,2,3-benzotriazole | | 0.97 | 0.43 | | 0.08 | 0.17 | 0.91 | 1.01 | | | | | | | | | |
| Sodium L-ascorbate | | 1.94 | | 1.43 | | | | | 0.26 | 0.43 | 2.63 | 3.04 | 1.43 | 1.43 | 7.50 | 0.30 | 0.25 |
| Ion-exchanged water | 90.00 | 87.10 | 89.57 | 88.57 | 89.92 | 89.83 | 89.09 | 88.99 | 89.74 | 89.57 | 87.37 | 86.96 | 88.57 | 88.57 | 82.50 | 89.70 | 89.75 |

TABLE 3

Composition of second coating solution

| | Second coating solution No. | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Hindered amine LA-63P | | | | | | | | | | | | | | | | | |
| Aluminum sulfate | | | | 10.00 | 10.00 | 10.00 | | | | | | | | | | | |
| Aluminum chloride | | | | | | | 10.00 | 10.00 | 10.00 | | | | | | | | |
| Iron(II) sulfate | | | | | | | | | | 10.00 | 10.00 | 10.00 | | | | | |
| Zirconium chloride | | | | | | | | | | | | | 10.00 | 10.00 | 10.00 | | |
| Nitrate of polyallylamine | 10.00 | 10.00 | 10.00 | | | | | | | | | | | | | 10.00 | 10.00 |
| Polyaluminum chloride | | | | | | | | | | | | | | | | | |
| Sulfate of DCDA/DETA | | | | | | | | | | | | | | | | | |
| Zirconium acetate | | | | | | | | | | | | | | | | | |
| Aluminum chloride | | | | | | | | | | | | | | | | | |
| Polyvinyl pyrrolidone | | | | | | | | | | | | | | | | | |
| 1,2,3-benzotriazole | | | | | | | | | | | | | | | | | |

TABLE 3-continued

Composition of second coating solution

| | Second coating solution No. | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Sodium L-ascorbate | 7.50 | 0.30 | 0.25 | 3.75 | 1.50 | 0.50 | 3.75 | 1.50 | 0.50 | 2.50 | 1.50 | 0.75 | 2.50 | 1.50 | 0.75 | 3.00 | 0.50 |
| Ion-exchanged water | 82.50 | 89.70 | 89.75 | 86.25 | 88.50 | 89.50 | 86.25 | 88.50 | 89.50 | 87.50 | 88.50 | 89.25 | 87.50 | 88.50 | 89.25 | 87.00 | 89.50 |

TABLE 4

Composition of second coating solution

| | Second coating solution No. | | | | | | | | | | | | | | | | |
|---|---|---|---|---|---|---|---|---|---|---|---|---|---|---|---|---|---|
| | 35 | 36 | 37 | 38 | 39 | 40 | 41 | 42 | 43 | 44 | 45 | 46 | 47 | 48 | 49 | 50 | 51 |
| Hindered amine LA-63P | | | | | | | | | | | | | 10.00 | | 10.00 | | |
| Aluminum sulfate | | | | | | | | | | | | | | | | | |
| Aluminum chloride | | | | | | | | | | | | | | | | | |
| Iron(II) sulfate | | | | | | | | | | | | | | | | | |
| Zirconium chloride | | | | | | | | | | | | | | | | | |
| Nitrate of polyallylamine | | | | | | | | | | | | | | | | | 10.00 |
| Polyaluminum chloride | 10.00 | 10.00 | 10.00 | | | | | | | | | | | | | | |
| Sulfate of DCDA/DETA | | | | 10.00 | 10.00 | 10.00 | | | | | | | | | | | |
| Zirconium acetate | | | | | | | 10.00 | 10.00 | 10.00 | | | | | | | | |
| Aluminum chloride | | | | | | | | | | 10.00 | 10.00 | 10.00 | | | | | |
| Polyvinyl pyrrolidone | | | | | | | | | | | | | | | 10.00 | | |
| 1,2,3-benzotriazole | | | | | | | | | | | | | 0.02 | | | | |
| Sodium L-ascorbate | 3.00 | 1.50 | 0.50 | 3.00 | 1.50 | 0.50 | 7.50 | 1.50 | 0.30 | 7.50 | 1.50 | 0.30 | | 1.43 | 1.43 | 15.00 | 15.00 |
| Ion-exchanged water | 87.00 | 88.50 | 89.50 | 87.00 | 88.50 | 89.50 | 82.50 | 88.50 | 89.70 | 82.50 | 88.50 | 89.70 | 89.98 | 98.57 | 88.57 | 75.00 | 75.00 |

TABLE 5

Type and characteristics of printing medium

| | Type of substrate | Type of first coating solution | Type of second coating solution | Content of cationic compound per unit area of ink-receiving layer (g/m$^2$) | Content of chloride ion capture agent per unit area of ink-receiving layer (g/m$^2$) | Content of organic antioxidant per unit area of ink-receiving layer (g/m$^2$) |
|---|---|---|---|---|---|---|
| Printing medium 1 | 1 | 1 | 1 | 1.20 | 0.00 | 0.00 |
| Printing medium 2 | 2 | 2 | 1 | 1.20 | 0.00 | 0.00 |
| Printing medium 3 | 2 | 2 | 2 | 0.93 | 0.09 | 0.18 |
| Printing medium 4 | 2 | 2 | 3 | 1.15 | 0.05 | 0.00 |
| Printing medium 5 | 2 | 2 | 4 | 1.05 | 0.00 | 0.15 |
| Printing medium 6 | 2 | 2 | 5 | 1.19 | 0.01 | 0.00 |
| Printing medium 7 | 2 | 2 | 6 | 1.18 | 0.02 | 0.00 |
| Printing medium 8 | 2 | 2 | 7 | 1.10 | 0.10 | 0.00 |
| Printing medium 9 | 2 | 2 | 8 | 1.09 | 0.11 | 0.00 |
| Printing medium 10 | 2 | 2 | 9 | 1.17 | 0.00 | 0.03 |
| Printing medium 11 | 2 | 2 | 10 | 1.15 | 0.00 | 0.05 |
| Printing medium 12 | 2 | 2 | 11 | 0.95 | 0.00 | 0.25 |
| Printing medium 13 | 2 | 2 | 12 | 0.92 | 0.00 | 0.28 |
| Printing medium 14 | 2 | 3 | 4 | 1.05 | 0.00 | 0.15 |
| Printing medium 15 | 2 | 4 | 4 | 1.05 | 0.00 | 0.15 |
| Printing medium 16 | 2 | 5 | 4 | 1.05 | 0.00 | 0.15 |
| Printing medium 17 | 2 | 6 | 4 | 1.05 | 0.00 | 0.15 |
| Printing medium 18 | 2 | 2 | 4 | 1.05 | 0.00 | 0.15 |
| Printing medium 19 | 2 | 2 | 4 | 1.05 | 0.00 | 0.15 |
| Printing medium 20 | 2 | 2 | 13 | 1.05 | 0.00 | 0.15 |
| Printing medium 21 | 2 | 2 | 14 | 1.05 | 0.00 | 0.15 |
| Printing medium 22 | 2 | 2 | 15 | 0.20 | 0.00 | 0.15 |
| Printing medium 23 | 2 | 2 | 16 | 5.00 | 0.00 | 0.15 |
| Printing medium 24 | 2 | 2 | 17 | 6.00 | 0.00 | 0.15 |
| Printing medium 25 | 2 | 2 | 18 | 0.20 | 0.00 | 0.15 |
| Printing medium 26 | 2 | 2 | 19 | 5.00 | 0.00 | 0.15 |
| Printing medium 27 | 2 | 2 | 20 | 6.00 | 0.00 | 0.15 |
| Printing medium 28 | 2 | 2 | 21 | 0.40 | 0.00 | 0.15 |
| Printing medium 29 | 2 | 2 | 22 | 1.00 | 0.00 | 0.15 |
| Printing medium 30 | 2 | 2 | 23 | 3.00 | 0.00 | 0.15 |
| Printing medium 31 | 2 | 2 | 24 | 0.40 | 0.00 | 0.15 |
| Printing medium 32 | 2 | 2 | 25 | 1.00 | 0.00 | 0.15 |

TABLE 6

Type and characteristics of printing medium

| | Type of substrate | Type of first coating solution | Type of second coating solution | Content of cationic compound per unit area of ink-receiving layer (g/m$^2$) | Content of chloride ion capture agent per unit area of ink-receiving layer (g/m$^2$) | Content of organic antioxidant per unit area of ink-receiving layer (g/m$^2$) |
|---|---|---|---|---|---|---|
| Printing medium 33 | 2 | 2 | 26 | 3.00 | 0.00 | 0.15 |
| Printing medium 34 | 2 | 2 | 27 | 0.60 | 0.00 | 0.15 |
| Printing medium 35 | 2 | 2 | 28 | 1.00 | 0.00 | 0.15 |
| Printing medium 36 | 2 | 2 | 29 | 2.00 | 0.00 | 0.15 |
| Printing medium 37 | 2 | 2 | 30 | 0.60 | 0.00 | 0.15 |
| Printing medium 38 | 2 | 2 | 31 | 1.00 | 0.00 | 0.15 |
| Printing medium 39 | 2 | 2 | 32 | 2.00 | 0.00 | 0.15 |
| Printing medium 40 | 2 | 2 | 33 | 0.50 | 0.00 | 0.15 |
| Printing medium 41 | 2 | 2 | 34 | 3.00 | 0.00 | 0.15 |
| Printing medium 42 | 2 | 2 | 35 | 0.50 | 0.00 | 0.15 |
| Printing medium 43 | 2 | 2 | 36 | 1.00 | 0.00 | 0.15 |
| Printing medium 44 | 2 | 2 | 37 | 3.00 | 0.00 | 0.15 |
| Printing medium 45 | 2 | 2 | 38 | 0.50 | 0.00 | 0.15 |
| Printing medium 46 | 2 | 2 | 39 | 1.00 | 0.00 | 0.15 |
| Printing medium 47 | 2 | 2 | 40 | 3.00 | 0.00 | 0.15 |
| Printing medium 48 | 2 | 2 | 41 | 0.20 | 0.00 | 0.15 |
| Printing medium 49 | 2 | 2 | 42 | 1.00 | 0.00 | 0.15 |
| Printing medium 50 | 2 | 2 | 43 | 5.00 | 0.00 | 0.15 |
| Printing medium 51 | 2 | 2 | 44 | 0.20 | 0.00 | 0.15 |
| Printing medium 52 | 2 | 2 | 45 | 1.00 | 0.00 | 0.15 |
| Printing medium 53 | 2 | 2 | 46 | 5.00 | 0.00 | 0.15 |
| Printing medium 54 | 2 | 2 | 47 | 6.00 | 0.01 | 0.00 |
| Printing medium 55 | 2 | 2 | 48 | 0.00 | 0.00 | 0.15 |
| Printing medium 56 | 2 | 2 | 49 | 0.00 | 0.00 | 0.15 |
| Printing medium 57 | 2 | 2 | 50 | 0.10 | 0.00 | 0.15 |
| Printing medium 58 | 2 | 2 | 51 | 0.10 | 0.00 | 0.15 |

Preparation of Silver Particle Dispersion Liquid

Silver particle dispersion liquid 1 (content of silver particles of 20.0%, content of resin of 2.0%) was produced in conformity with the description on the preparation method in example 2 of International Publication No. 2008/049519. Further, silver particle dispersion liquid 2 (content of silver particles of 20.0%, content of surfactant of 2.0%) was produced in conformity with the description on a preparation method in example 2-2 of Japanese Patent Laid-Open No. 2004-285106. Silver particle dispersion liquids 3 and 4 were prepared in the same manner as silver particle dispersion liquid 2 except that the value of $D_{50}$ was changed by changing the agitation speed in the preparation. Silver particle dispersion liquids 5, 6, 7, and 8 were prepared in the same manner as silver particle dispersion liquid 1 except that the content of the dispersant was changed. Table 7 shows $D_{50}$ of silver particles determined by observing a cross section of the resulting image with a scanning electron microscope (SEM). Table 7 also shows the content of the dispersant in the dispersion liquid.

TABLE 7

Characteristics of silver particle dispersion liquid

| | $D_{50}$ (nm) of silver particles | Content of dispersant in dispersion liquid (%) |
|---|---|---|
| Silver particle dispersion liquid 1 | 32 | 2.0 |
| Silver particle dispersion liquid 2 | 32 | 2.0 |
| Silver particle dispersion liquid 3 | 150 | 2.0 |
| Silver particle dispersion liquid 4 | 160 | 2.0 |
| Silver particle dispersion liquid 5 | 32 | 0.4 |
| Silver particle dispersion liquid 6 | 32 | 1.0 |
| Silver particle dispersion liquid 7 | 32 | 20.0 |
| Silver particle dispersion liquid 8 | 32 | 22.0 |

Preparation of First Ink

The components described in Table 8 were mixed and agitated sufficiently. Thereafter, pressure filtration was performed by a filter having a pore size of 1.2 μm so as to produce a first ink. Acetylenol E100 is a nonionic surfactant produced by Kawaken Fine Chemicals Co., Ltd. Acetylenol E100 has an HLB value of 13 that is determined by a Griffin method. Compound 1 is C.I. Acid Blue 9, as described later.

TABLE 8

| | Composition of first ink | | | | | | | | |
|---|---|---|---|---|---|---|---|---|---|
| | First ink No. | | | | | | | | |
| | 1 | 2 | 3 | 4 | 5 | 6 | 7 | 8 | 9 |
| Silver particle dispersion liquid 1 | 50.0 | | | | | | | | |
| Silver particle dispersion liquid 2 | | 50.0 | | | | | | | 50.0 |
| Silver particle dispersion liquid 3 | | | 50.0 | | | | | | |
| Silver particle dispersion liquid 4 | | | | 50.0 | | | | | |
| Silver particle dispersion liquid 5 | | | | | 50.0 | | | | |
| Silver particle dispersion liquid 6 | | | | | | 50.0 | | | |
| Silver particle dispersion liquid 7 | | | | | | | 50.0 | | |
| Silver particle dispersion liquid 8 | | | | | | | | 50.0 | |
| Ethylene glycol | 20.0 | 20.0 | 20.0 | 20.0 | 20.0 | 20.0 | 20.0 | 20.0 | 20.0 |
| Acetylenol E100 | 0.2 | 0.2 | 0.2 | 0.2 | 0.2 | 0.2 | 0.2 | 0.2 | 0.2 |
| Compound 1 | | | | | | | | | 5.0 |
| Ion-exchanged water | 29.8 | 29.8 | 29.8 | 29.8 | 29.8 | 29.8 | 29.8 | 29.8 | 24.8 |

Preparation of Second Ink
Preparation of Dye

Compounds described below were prepared. The structural formula of compound 3 is expressed as a free acid, but a potassium salt thereof was used.
Compound 1: C.I. Acid Blue 9
Compound 2: C.I. Acid Red 249
Compound 3: a potassium salt of compound denoted by formula (2) in the form of a free acid, described below, that was synthesized in conformity with the description on the synthesis method of Japanese Patent Laid-Open No. 2016-108545 formula (2)

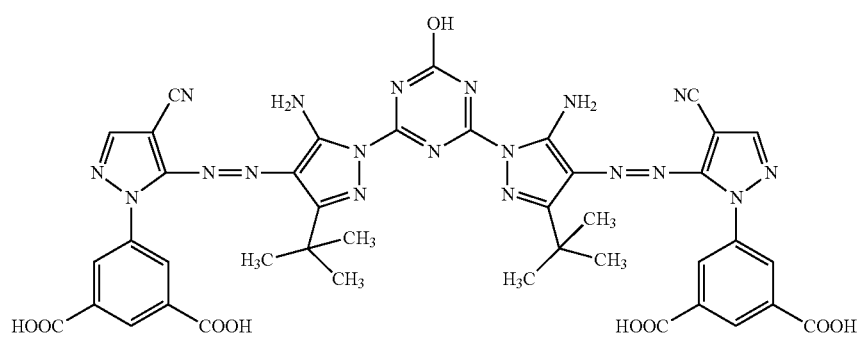

Second Ink

The components described in Table 9 were mixed and agitated sufficiently. Thereafter, pressure filtration was performed by a filter having a pore size of 1.2 μm so as to produce a second ink. Acetylenol E100 is a nonionic surfactant produced by Kawaken Fine Chemicals Co., Ltd.

TABLE 9

| | Composition of second ink | | |
|---|---|---|---|
| | Second ink No. | | |
| | 1 | 2 | 3 |
| Compound 1 | 5.0 | | |
| Compound 2 | | 5.0 | |
| Compound 3 | | | 5.0 |
| Glycerin | 15.0 | 15.0 | 15.0 |
| Ethylene glycol | 10.0 | 10.0 | 10.0 |
| Acetylenol E100 | 0.5 | 0.5 | 0.5 |
| Ion-exchanged water | 69.5 | 69.5 | 69.5 |

Evaluation

An ink cartridge was filled with the first ink and another ink cartridge was filled with the second ink, as described in Tables 10 and 11, and the ink cartridges were set in an inkjet printing apparatus (PIXUS MG3630, produced by CANON KABUSHIKI KAISHA) provided with a printing head that ejected the inks because of the action of thermal energy. In the present example, regarding the first ink, an image printed under the condition in which 2 ink droplets, about 11.2 ng each, were applied to a unit region of 1/600 inch×1/600 inch was assumed to be an image with a printing duty of 100%. Regarding the second ink, an image printed under the condition in which 2 ink droplets, about 5.7 ng each, were applied to a unit region of 1/600 inch×1/600 inch was assumed to be an image with a printing duty of 100%. The above-described inkjet printing apparatus was used and the first ink was applied with a printing duty of 50% to each of the printing media described in Tables 10 and 11. Thereafter, the second ink was applied with a printing duty of 100% so as to at least overlap a region provided with the first ink. AAA, AA, A, or B in the following evaluation criteria was assumed to be a tolerable level, and C was assumed to be an intolerable level. The evaluation results are shown in Tables 10 and 11.

Color Developability

The color developability was evaluated by performing a measurement as described below where an SCI mode of an integrating sphere colorimeter CM-2600d (produced by KONICA MINOLTA, INC.) was used. Only the first ink containing silver particles was used, and $a_0^*$ and $b_0^*$ of an image printed with a printing duty of 100% were measured. Subsequently, the ink containing silver particles and the ink containing a dye were used, and $a_1^*$ and $b_1^*$ of an image printed with a printing duty of 100% each were measured. These values were used, and the color difference $\Delta E_{ab}$ was calculated by using a formula $\Delta E_{ab} = \{(a_1^* - a_0^*)^2 + (b_1^* - b_0^*)^2\}^{1/2}$. In this regard, a* and b* refer to values in the L*a*b* display system specified by CIE (International Commission on Illumination). When $\Delta E_{ab}$ was 2.0 or more, regarding an image produced, the color tone of the dye used rather than silver was observed. When the value of $\Delta E_{ab}$ increased, regarding an image produced, the color tone of the dye used was more clearly observed.

AAA: $\Delta E_{ab}$ was 12.0 or more
AA: $\Delta E_{ab}$ was 10.0 or more to less than 12.0
A: $\Delta E_{ab}$ was 6.0 or more to less than 10.0
B: $\Delta E_{ab}$ was 2.0 or more to less than 6.0
C: $\Delta E_{ab}$ was less than 2.0

Glossiness

Regarding the resulting image, the vividness L/w (L was a value of the highest lightness among the lightness measured by a light receiving portion of a spectrophotometer, and w was the width of two acceptance angles that showed a half value of L (L/2)) was measured by using Goniospectrophotometer (GSP-2, produced by MURAKAMI COLOR RESEARCH LABORATORY). When the value of vividness was 0.2 or more, it was recognized that the image had glossiness because the lightness varied in accordance with the angle of visual observation of the image.

AA: the vividness was 0.6 or more
A: the vividness was 0.4 or more to less than 0.6
B: the vividness was 0.2 or more to less than 0.4

Variation with Time in Glossiness

A solid image was printed with a printing duty of 100% by using the first ink. The resulting solid image was dried by being left to stand for 1 day in an environment at a temperature of 25° C. and a relative humidity of 50%. Thereafter, a gloss meter (VG 7000, produced by NIPPON DENSHOKU INDUSTRIES CO., LTD.) was used, and 60-degree specular glossiness was measured (the glossiness before a test was assumed to be a). Thereafter, the solid image was exposed to mixed gas (0.90 ppm of $NO_2$ gas, 0.05 ppm of $SO_2$ gas, and 0.15 ppm of $O_3$ gas) such that the solid image was left to stand for 36 hours in a gas corrosion test instrument (produced by Suga Test Instruments Co., Ltd.) in which the temperature in a chamber was 25° C. and the relative humidity was 80%. Subsequently, the 60-degree specular glossiness of the solid image was measured again (the glossiness after the test was assumed to be b). Then, the rate of reduction in the glossiness was calculated on the basis of a formula b/a×100(%), and variation with time in the glossiness was evaluated under the following criteria. A lower rate of reduction in the glossiness means that reduction in the glossiness of the image is suppressed.

A: the rate of reduction in the glossiness was less than 50%
B: the rate of reduction in the glossiness was 50% or more

TABLE 10

| | Evaluation condition | | | Evaluation result | | |
|---|---|---|---|---|---|---|
| | Type of printing medium | Applied first Type of ink | Applied second Type of ink | Color developability | Glossiness | Variation with time in Glossiness |
| Example 1 | 1 | first ink 1 | second ink 1 | A | A | A |
| Example 2 | 2 | first ink 1 | second ink 1 | AA | A | B |
| Example 3 | 3 | first ink 1 | second ink 1 | AA | A | A |
| Example 4 | 4 | first ink 1 | second ink 1 | AA | A | A |
| Example 5 | 5 | first ink 1 | second ink 1 | AA | A | A |
| Example 6 | 6 | first ink 1 | second ink 1 | AA | A | B |
| Example 7 | 7 | first ink 1 | second ink 1 | AA | A | A |
| Example 8 | 8 | first ink 1 | second ink 1 | AA | A | A |
| Example 9 | 9 | first ink 1 | second ink 1 | A | B | A |
| Example 10 | 10 | first ink 1 | second ink 1 | AA | A | B |
| Example 11 | 11 | first ink 1 | second ink 1 | AA | A | A |
| Example 12 | 12 | first ink 1 | second ink 1 | AA | A | A |
| Example 13 | 13 | first ink 1 | second ink 1 | A | B | A |
| Example 14 | 5 | first ink 1 | second ink 1 | AA | A | A |
| Example 15 | 14 | first ink 1 | second ink 1 | AAA | AA | A |
| Example 16 | 15 | first ink 1 | second ink 1 | AAA | AA | A |
| Example 17 | 16 | first ink 1 | second ink 1 | AAA | AA | A |
| Example 18 | 17 | first ink 1 | second ink 1 | AA | A | A |
| Example 19 | 18 | first ink 1 | second ink 1 | AA | A | A |
| Example 20 | 19 | first ink 1 | second ink 1 | A | B | A |
| Example 21 | 5 | first ink 1 | second ink 2 | AA | A | A |
| Example 22 | 5 | first ink 1 | second ink 3 | AA | A | A |
| Example 23 | 5 | first ink 2 | second ink 1 | AA | A | A |
| Example 24 | 20 | first ink 2 | second ink 1 | AA | A | A |
| Example 25 | 20 | first ink 2 | second ink 2 | AA | A | A |
| Example 26 | 20 | first ink 2 | second ink 3 | AA | A | A |
| Example 27 | 21 | first ink 1 | second ink 1 | AA | A | A |
| Example 28 | 22 | first ink 2 | second ink 1 | AA | A | A |

TABLE 10-continued

| | Evaluation condition | | | Evaluation result | | |
|---|---|---|---|---|---|---|
| | Type of printing medium | Applied first Type of ink | Applied second Type of ink | Color developability | Glossiness | Variation with time in Glossiness |
| Example 29 | 23 | first ink 2 | second ink 1 | AA | A | A |
| Example 30 | 24 | first ink 2 | second ink 1 | AA | B | A |
| Example 31 | 25 | first ink 1 | second ink 1 | AA | A | A |
| Example 32 | 26 | first ink 1 | second ink 1 | AA | A | A |
| Example 33 | 27 | first ink 1 | second ink 1 | AA | B | A |
| Example 34 | 20 | first ink 3 | second ink 1 | AA | A | A |
| Example 35 | 20 | first ink 4 | second ink 1 | AA | B | A |
| Example 36 | 5 | first ink 3 | second ink 1 | AA | A | A |
| Example 37 | 5 | first ink 4 | second ink 1 | AA | B | A |
| Example 38 | 28 | first ink 2 | second ink 1 | AA | A | A |
| Example 39 | 29 | first ink 2 | second ink 1 | AA | A | A |

TABLE 11

| | Evaluation condition | | | Evaluation result | | |
|---|---|---|---|---|---|---|
| | Type of printing medium | Applied first Type of ink | Applied second Type of ink | Color developability | Glossiness | Variation with time in glossiness |
| Example 40 | 30 | first ink 2 | second ink 1 | AA | A | A |
| Example 41 | 31 | first ink 2 | second ink 1 | AA | A | A |
| Example 42 | 32 | first ink 2 | second ink 1 | AA | A | A |
| Example 43 | 33 | first ink 2 | second ink 1 | AA | A | A |
| Example 44 | 34 | first ink 2 | second ink 1 | AA | A | A |
| Example 45 | 35 | first ink 2 | second ink 1 | AA | A | A |
| Example 46 | 36 | first ink 2 | second ink 1 | AA | A | A |
| Example 47 | 37 | first ink 2 | second ink 1 | AA | A | A |
| Example 48 | 38 | first ink 2 | second ink 1 | AA | A | A |
| Example 49 | 39 | first ink 2 | second ink 1 | AA | A | A |
| Example 50 | 40 | first ink 1 | second ink 1 | AA | A | A |
| Example 51 | 41 | first ink 1 | second ink 1 | AA | A | A |
| Example 52 | 42 | first ink 1 | second ink 1 | AA | A | A |
| Example 53 | 43 | first ink 1 | second ink 1 | AA | A | A |
| Example 54 | 44 | first ink 1 | second ink 1 | AA | A | A |
| Example 55 | 45 | first ink 1 | second ink 1 | AA | A | A |
| Example 56 | 46 | first ink 1 | second ink 1 | AA | A | A |
| Example 57 | 47 | first ink 1 | second ink 1 | AA | A | A |
| Example 58 | 48 | first ink 1 | second ink 1 | AA | A | A |
| Example 59 | 49 | first ink 1 | second ink 1 | AA | A | A |
| Example 60 | 50 | first ink 1 | second ink 1 | AA | A | A |
| Example 61 | 51 | first ink 1 | second ink 1 | AA | A | A |
| Example 62 | 52 | first ink 1 | second ink 1 | AA | A | A |
| Example 63 | 53 | first ink 1 | second ink 1 | AA | A | A |
| Example 64 | 5 | first ink 5 | second ink 1 | AA | A | A |
| Example 65 | 5 | first ink 6 | second ink 1 | AA | A | A |
| Example 66 | 5 | first ink 7 | second ink 1 | AA | A | A |
| Example 67 | 5 | first ink 8 | second ink 1 | AA | B | A |
| Example 68 | 54 | first ink 4 | second ink 1 | B | B | B |
| Comparative Example 1 | 20 | first ink 9 | — | C | A | A |
| Comparative Example 2 | 20 | first ink 2 | — | C | A | A |
| Comparative Example 3 | 55 | first ink 2 | second ink 1 | C | A | A |
| Comparative Example 4 | 56 | first ink 1 | second ink 1 | C | A | A |
| Comparative Example 5 | 57 | first ink 2 | second ink 1 | C | A | A |
| Comparative Example 6 | 58 | first ink 1 | second ink 1 | C | A | A |
| Comparative Example 7 | 5 | second ink 1 | first ink 1 | C | A | A |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098240 filed May 17, 2017 and No.

2018-077806 filed Apr. 13, 2018, which are hereby incorporated by reference herein in their entirety.

What is claimed is:

1. An inkjet printing method comprising the steps of:
   applying a first ink to a printing medium; and
   applying a second ink to the printing medium so as to at least overlap a region provided with the first ink,
   wherein the first ink is an aqueous ink comprising silver particles,
   the second ink is an aqueous ink comprising an anionic dye,
   the printing medium includes an ink-receiving layer comprising at least one cationic compound selected from the group consisting of a polyvalent metal salt and a salt of a cationic resin,
   the polyvalent metal salt is at least one member selected from the group consisting of (i) a salt of an ion of at least one polyvalent metal selected from the group consisting of iron, aluminum, and zirconium and at least one anion selected from the group consisting of acetate ion, chloride ion, and sulfate ion and (ii) polyaluminum chloride,
   the salt of a cationic resin is at least one member selected from the group consisting of a nitrate of a resin having any one of primary to quaternary amine structures and a sulfate of a resin having any one of primary to quaternary amine structures, and
   the content ($g/m^2$) of the cationic compound per unit area of the ink-receiving layer is 0.20 $g/m^2$ or more.

2. The inkjet printing method according to claim 1, wherein the content of the cationic compound per unit area of the ink-receiving layer is 5.00 $g/m^2$ or less.

3. The inkjet printing method according to claim 1, wherein the particle diameter at a cumulative volume of 50% of the silver particles is 150 nm or less.

4. The inkjet printing method according to claim 3, wherein the particle diameter (nm) at a cumulative volume of 50% of the silver particles is 1 nm or more.

5. The inkjet printing method according to claim 1, wherein the ink-receiving layer comprises chloride ions and at least one member selected from the group consisting of a chloride-ion capture agent and an organic antioxidant.

6. The inkjet printing method according to claim 5, wherein the ink-receiving layer satisfies at least one of condition (1) and condition (2),
   condition (1): the content of the chloride-ion capture agent per unit area of the ink-receiving layer is 0.02 $g/m^2$ or more to 0.15 $g/m^2$ or less, and
   condition (2): the content of the organic antioxidant per unit area of the ink-receiving layer is 0.05 $g/m^2$ or more to 0.25 $g/m^2$ or less.

7. The inkjet printing method according to claim 5, wherein the chloride-ion capture agent is 1,2,3-benzotriazole or a derivative thereof.

8. The inkjet printing method according to claim 5, wherein the organic antioxidant is ascorbic acid or a salt thereof.

9. The inkjet printing method according to claim 1,
   wherein the ink-receiving layer comprises a polyvinyl alcohol or a derivative thereof and a crosslinking agent, and
   the content of the crosslinking agent in the ink-receiving layer is 0.40 equivalent or more to 1.00 equivalent or less relative to the content of the polyvinyl alcohol or a derivative thereof.

10. The inkjet printing method according to claim 9, wherein the crosslinking agent is boric acid or a borate.

11. The inkjet printing method according to claim 9, wherein the crosslinking agent is orthoboric acid.

12. The inkjet printing method according to claim 1, wherein a paper surface pH of the printing medium is 6.0 or less.

13. The inkjet printing method according to claim 1, wherein the content of the cationic compound per unit area of the ink-receiving layer is 0.70 $g/m^2$ or more.

14. The inkjet printing method according to claim 1, wherein the polyvalent metal salt is at least one selected from the group consisting of aluminum chloride, aluminum sulfate, iron (II) sulfate, and polyaluminum chloride.

15. The inkjet printing method according to claim 1, wherein the content (% by mass) of silver particles in the first ink is 2.0% by mass or more to 15.0% by mass or less with reference to the total mass of the first ink.

16. The inkjet printing method according to claim 1, wherein the content (% by mass) of the dye in the second ink is 1.0% by mass or more to 10.0% by mass or less with reference to the total mass of the second ink.

17. An inkjet printing apparatus comprising a unit arranged to apply a second ink to a printing medium after a first ink is applied to the printing medium,
   wherein the first ink is an aqueous ink comprising silver particles,
   the second ink is an aqueous ink comprising an anionic dye,
   the printing medium includes an ink-receiving layer comprising at least one cationic compound selected from the group consisting of a polyvalent metal salt and a salt of a cationic resin,
   the polyvalent metal salt is at least one member selected from the group consisting of (i) a salt of an ion of at least one polyvalent metal selected from the group consisting of iron, aluminum, and zirconium and at least one anion selected from the group consisting of acetate ion, chloride ion, and sulfate ion and (ii) polyaluminum chloride,
   the salt of a cationic resin is at least one member selected from the group consisting of a nitrate of a resin having any one of primary to quaternary amine structures and a sulfate of a resin having any one of primary to quaternary amine structures, and
   the content of the cationic compound per unit area of the ink-receiving layer is 0.20 $g/m^2$ or more.

* * * * *